United States Patent
Metzger et al.

(10) Patent No.: US 10,505,623 B2
(45) Date of Patent: Dec. 10, 2019

(54) QUALITY OF SERVICE LEVEL SELECTION FOR PEER SATELLITE COMMUNICATIONS

(71) Applicant: Vector Launch Inc., Tucson, AZ (US)

(72) Inventors: John Metzger, Campbell, CA (US); Darren D. Garber, Campbell, CA (US); Shaun Coleman, San Jose, CA (US)

(73) Assignee: Vector Launch Inc., Tucson, AZ (US)

( * ) Notice: Subject to any disclaimer, the term of this patent is extended or adjusted under 35 U.S.C. 154(b) by 0 days.

(21) Appl. No.: 15/923,559

(22) Filed: Mar. 16, 2018

(65) Prior Publication Data

US 2019/0288771 A1   Sep. 19, 2019

(51) Int. Cl.
*H04B 7/185*   (2006.01)
*H04W 24/02*   (2009.01)
*H04W 84/06*   (2009.01)

(52) U.S. Cl.
CPC ........ *H04B 7/18519* (2013.01); *H04W 24/02* (2013.01); *H04W 84/06* (2013.01)

(58) Field of Classification Search
CPC combination set(s) only.
See application file for complete search history.

(56) References Cited

U.S. PATENT DOCUMENTS

| | | | |
|---|---|---|---|
| 6,442,147 B1 | 8/2002 | Mauger et al. | |
| 6,480,495 B1 * | 11/2002 | Mauger | H04B 7/18578 370/316 |
| 6,628,919 B1 * | 9/2003 | Curello | H04B 7/18521 370/316 |
| 6,985,454 B1 * | 1/2006 | Wiedeman | H04B 7/18589 370/316 |
| 9,335,417 B2 * | 5/2016 | Kim | G01S 19/25 |
| 9,641,238 B1 | 5/2017 | Coleman et al. | |
| 9,722,692 B1 | 8/2017 | Coleman et al. | |
| 9,904,535 B2 * | 2/2018 | Gross | G06F 8/65 |
| 2003/0185215 A1 * | 10/2003 | Wright | H04L 29/06 370/395.5 |
| 2004/0219879 A1 * | 11/2004 | Stephenson | H04B 7/18508 455/12.1 |
| 2005/0152300 A1 | 7/2005 | Edsberg | |
| 2010/0201569 A1 * | 8/2010 | Lee | G01S 5/0036 342/357.42 |
| 2011/0299546 A1 * | 12/2011 | Prodan | G06Q 20/10 370/401 |
| 2012/0020280 A1 * | 1/2012 | Jansson | H04B 7/18582 370/316 |

(Continued)

OTHER PUBLICATIONS

International Application No. PCT/US2018/022987, International Search Report & Written Opinion, 14 pages, dated Jul. 6, 2018.

*Primary Examiner* — Mounir Moutaouakil

(57) ABSTRACT

Various enhanced operational and communication handling techniques for satellite devices are discussed herein. In one example, a method of operating an orbital satellite device of a satellite cluster is provided. The method includes identifying operational status information for at least a peer satellite device in communication range of the satellite device. Based at least on the operational status information, the method includes selecting a quality of service level for communications to be transferred to the peer satellite device, and applying the quality service level to transmit data packets to the peer satellite device.

20 Claims, 6 Drawing Sheets

(56) References Cited

U.S. PATENT DOCUMENTS

| | | | |
|---|---|---|---|
| 2012/0311555 A1* | 12/2012 | Nijenkamp | G06F 8/65 717/170 |
| 2013/0336168 A1* | 12/2013 | Schlipf | H04L 41/0813 370/255 |
| 2014/0039963 A1* | 2/2014 | Augenstein | G06Q 10/06314 705/7.24 |
| 2016/0037434 A1 | 2/2016 | Gopal et al. | |
| 2016/0080072 A1 | 3/2016 | Baudoin et al. | |
| 2018/0143819 A1* | 5/2018 | Gross | G06F 8/65 |
| 2018/0155066 A1* | 6/2018 | Hwang | B64G 1/242 |

* cited by examiner

DYNAMIC FACTORS

500

| | TRAFFIC TYPE | FACTORS | METRIC | LEVEL OF SERVICE |
|---|---|---|---|---|
| 1 | Application image transfer | CPU UTIL. | >80% | 2 |
| 2 | Application image transfer | CPU UTIL. | <20% | 7 |
| 3 | Application image transfer | STORAGE | >100 MB | 7 |
| 4 | Application image transfer | STORAGE | <100 MB | 2 |
| 5 | Ground communications | GND LINK | ESTABLISHED | 5 |
| 6 | Ground communications | GND LINK | NO LINK | 0 |
| 7 | User software payload | GEO REGION | in zone | 10 |
| 8 | User software payload | GEO REGION | out of zone | 1 |
| 9 | Blockchain sync. | CPU UTIL. | <50% | 8 |
| 10 | Blockchain sync. | CPU UTIL. | >50% | 1 |

STATIC FACTORS

501

| | TRAFFIC TYPE | FACTORS | METRIC | LEVEL OF SERVICE |
|---|---|---|---|---|
| 1 | User software payload | SAT. LAYER | upper | 6 |
| 2 | User software payload | SAT. LAYER | lower | 3 |
| 3 | User software payload | GPU AVAIL. | not present | 1 |
| 4 | User software payload | GPU AVAIL. | present | 9 |
| 5 | Application image transfer | SAT. TYPE | COMM. RELAY | 8 |
| 6 | Application image transfer | SAT. TYPE | SENSOR | 4 |

FIGURE 5

QUALITY OF SERVICE LEVEL SELECTION FOR PEER SATELLITE COMMUNICATIONS

BACKGROUND

Satellites can be deployed into orbit to provide various space-based operations, such as military and civilian observation operations, communications operations, navigation operations, weather operations, and research operations. Satellites can include various sensors and communication equipment that are used to perform desired tasks. However, most satellites deployed in orbit comprise singular entities that are expensive to create and launch into orbit, especially for organizations that may not require the use of an entire satellite with a large number of sensors, or may not require continuous operations on the satellite. As a result, organizations may avoid the use of satellites, limiting the use of promising satellite technology. Furthermore, when many satellites are deployed, inter-satellite communications can be difficult to coordinate to achieve acceptable communication handling among satellites.

OVERVIEW

Various enhanced operational and communication handling techniques for satellite devices are discussed herein. In one example, a method of operating an orbital satellite device of a satellite cluster is provided. The method includes identifying operational status information for at least a peer satellite device in communication range of the satellite device. Based at least on the operational status information, the method includes selecting a quality of service level for communications to be transferred to the peer satellite device, and applying the quality service level to transmit data packets to the peer satellite device.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 5 illustrates communication prioritization according to an implementation.

DETAILED DESCRIPTION

Figure 1:
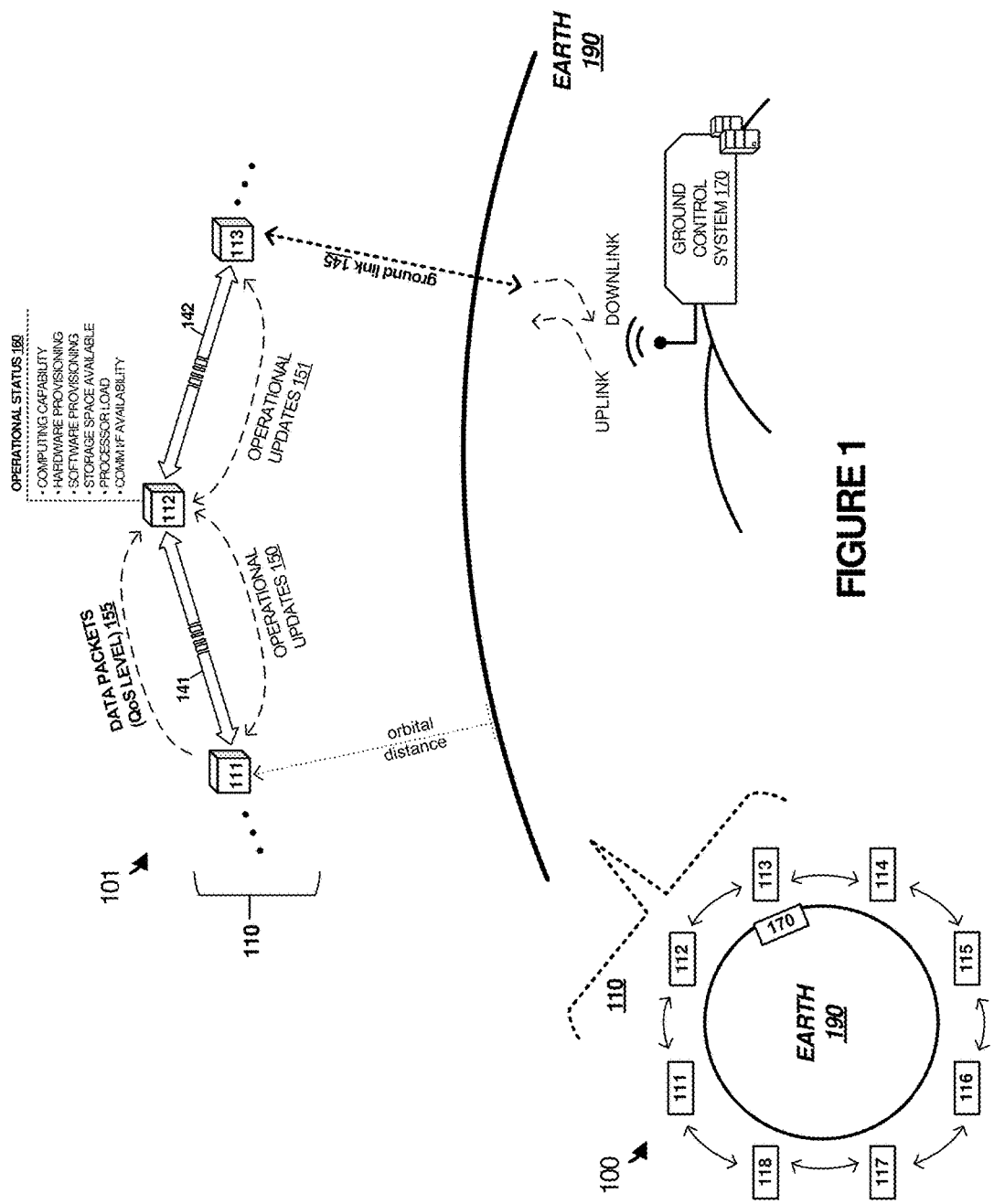
FIG. 1 illustrates a satellite environment according to an implementation.

The various examples disclosed herein provide enhancements for satellite hardware and software technology. Specifically, the examples herein include enhanced selection of quality of service levels for communications exchanged among satellite devices that form a cluster of satellites deployed in orbit. These satellite devices can be placed into various arrangements to form a satellite platform. For example, a cluster of satellite devices can be deployed into orbit using a launch system. These satellite devices can comprise general-purpose satellite devices, such as CubeSat devices configured with processing systems, storage systems, and communication systems. These satellite devices can also have specialized roles which can be defined according to provisioned hardware or software elements, or can be associated with a particular set of applications deployed to the associated satellite devices. In some examples, satellite devices can be placed within a similar orbital path to form a cluster of satellites, which might comprise one or more clustered rings of satellites orbiting Earth. This clustered ring arrangement provides for enhanced communications, redundancy, ground coverage, and fault-tolerance, among other operations.

Organizations may generate applications and deploy applications to the satellite devices to perform desired operations. The applications can comprise software modules, application images, application updates, or other software components. Example operations performed by the applications may include military and civilian observation operations, communications operations, navigation operations, weather operations, cryptocurrency operations, and research operations. Applications and associated data may be deployed in one or more satellite devices of the orbiting satellite platform. In some implementations, the application and associated data may be provided to each of the one or more satellite devices using a ground control system or ground communication system as an uplink to the one or more satellite devices. In other implementations, a single uplink may be made to a satellite device in the platform, wherein the satellite device is configured to distribute the application to other desired satellite devices in the platform. Once deployed in the environment, the application may execute on the assigned satellite devices.

In some implementations, the satellite devices of the satellite platform may each exchange data or other information with one or more other satellite devices and the ground control system for the platform. This data may include data comprising the applications themselves, or current operational state information for each of the applications, such as the tasks or processes that are operating, processed portions of data, blockchain portions, or blockchain ledger portions, and may further exchange data generated at least partially from the sensors or processing components of the satellite. This data may be used in a peer relationship among satellites, wherein a first satellite may process first data, and provide the first data to a second satellite. The second satellite may then determine second data and process the first and second data as defined by the application. This operation may be used, as an example, in imaging operations, wherein a first satellite may take images of an object over a first period of time, and provide data for the images to the second satellite. The second satellite may take subsequent images and use the data for the first images and the subsequent images to make a determination about an object. In other examples, blockchain processing can be established across the cluster, where a first satellite device performs calculations or other processes on a blockchain or ledger, and passes resultant data to a second satellite device for further processing, storage, or distribution. It should be understood that other operations may use peer sharing of state data.

In addition, the examples disclosed herein provide systems and methods for deploying modular software applications in an orbiting satellite platform, wherein each of the software applications executes as a virtual node that can share resources with one or more other applications deployed to the same satellite device. These virtual nodes may comprise full operating system virtual machines in some examples, and may further include virtual containers. These containers may include Docker containers, Linux containers, jails, or another similar type of virtual containment node, which can provide an efficient management of resources from a host system on a satellite device. The resources used by the containers may include kernel resources from the host computing system, and may further include repositories and other approved resources that can be shared with other containers or processes executing on the host. However, although resources may be shared between the containers on a host satellite device, the containers are provisioned to have private access to the operating system with their own identifier space, file system structure, and network interfaces.

As a first example satellite platform, FIG. 1 is shown. FIG. 1 illustrates a satellite environment 100 according to an implementation. Satellite environment 100 includes satellite cluster 110 with satellite devices 111-118 in a clustered orbital arrangement. FIG. 1 also includes ground control system 170 and Earth 190. The clustered orbital arrangement can be configured to orbit Earth 190 at an orbital distance, with an associated orbital inclination or other orbital properties that differentiate and form groupings of satellite devices generally orbiting in a similar orbital configuration. Detailed view 101 includes satellite devices 111-113 which communicate over variable bandwidth wireless network links 141-142. Ground control system 170 communicates with at least one satellite device using associated wireless communication link 145.

As described herein, a plurality of satellite devices 111-118 may be launched and deployed as an orbiting platform for a plurality of different software payloads. Ground control system 170 may initiate an uplink with one or more of the satellite devices to provide software payloads to the satellite devices, as well as update any scheduling and control information for the satellite devices. Once uploaded to the desired satellite devices, the software payloads may be executed by associated processing systems. In some implementations, the uplink from ground control system 170 may be responsible for providing the software payloads to the required satellite devices. In other implementations, ground control system 170 may supply an application or other software payload to a first set of satellite devices, which may then distribute the application to one or more other satellite devices of the satellite platform. For example, ground control system 170 may provide a first application to satellite device 113 over link 145, wherein satellite device 113 may, in turn supply the application to other satellite devices that form a peer group. In particular, satellite device 113 may provide the application to satellite 112, permitting satellite 112 to provide operations of the application without directly receiving the communication from ground control system 170. Additionally, similar to providing the initial configuration to the satellite devices, ground control system 170 may further be used to supply updates to each of the applications operating in the satellite platform, and may further update any scheduling and control information on each of the satellite devices.

At any given time, only one or more among the satellite devices might be able to communicate with ground system 170 over an associated link 145, such as shown in FIG. 1 for satellite device 113. This limitation on communication might be due to orbital status, positioning of the satellite devices, line-of-site configurations, role-based activity, satellite-to-ground antenna/transceiver availability, or other factors. To facilitate communications with ground system 170, the one or more satellite devices which have an active communication link with ground system 170 can receive communications from other ones of the satellite devices. In a clustered or ring arrangements of satellite devices, communications directed to ground system 170 can be routed among the satellite devices until the communications reach a satellite device with an active communication link with ground system 170. In FIG. 1, communications of satellite devices 111, 112, and 114-118 can be routed to satellite device 113 which can then route the communications over link 145 with ground system 170. Communications from ground system 170 to the satellite devices can proceed in a similar fashion, where communications are transferred from ground system 170 to a first satellite device which routes the communications to other satellite devices within the cluster or ring.

During operation, operational status information can be shared among satellite devices 111-118, as indicated in FIG. 1 as operational updates 150-151. This operational status information can be continually or periodically passed among the satellite devices in operational updates 150-151 to ensure each satellite device can be aware of an operational status of at least a proximate peer satellite device. Each satellite device can monitor its own operational status and provide updates on this operational status to other satellite devices. In FIG. 1, example operational status is shown for satellite device 112 as operational status 160. The operational status can be employed to alter communication handling processes among satellite devices, such as in altering quality of service (QoS) levels applied to various communications. Data packets that comprise the communications, such as data packets 155, can have appropriate QoS levels applied based in part on the operational updates received from adjacent or proximate satellite devices.

The operational status information, such as operational status 160 in FIG. 1, can include operational capabilities of a particular satellite device. These operational capabilities can be static or dynamic in nature. Static operational capabilities depend upon a type of satellite device deployed, such as when a role-based satellite device is employed or a particular model of satellite device differs among the originating satellite device and destination/target satellite device. Other static factors can include the particular suite of hardware deployed on the satellite devices, such as the included sensor devices, antenna equipment, transceiver/radio equipment, total processing capability of central processing unit(s) (CPU) or graphics processing unit(s) (GPU), and total data storage capacity. These static factors typically do no change appreciably once the satellite device has been deployed into orbit.

In addition to static factors and operational capabilities, other dynamic factors and operational capabilities might be considered, which can change relatively quickly over time. Operational updates 150-151 can thus indicate dynamic operational capabilities of satellite devices that might vary. These dynamic operational capabilities can include current CPU/GPU capacity not presently used by running applications, presently available data storage capacity not used by other stored data, presently available communication bandwidth for any associated transceivers/antennas, present operating states (e.g. fully capable or degraded operation), present list of installed applications, present list of executing/resident applications, and payload type (application data, application upload/upgrade, instructional commands), among other operational capabilities.

Moreover, quasi-dynamic logistical status might be exchanged among the satellite devices, which can comprise orbital configurations that might not change frequently. The status of orbital configurations can include satellite device positioning among rings or constellations formed among several satellite devices. At times, satellite devices can be included in different rings, layers of orbital rings, inclinations, or other arrangements. Status of the individual satellite devices can be exchanged that indicates positioning or arrangement indicators among these orbital configurations. Also, logistical information such as distance of satellite devices to ground stations, relative distance to closest satellite devices, orbital locations relative to Earth 190 or other metrics, time of day, or geographic or spatial regions encountered by satellite devices, or global positioning coordinates can be exchanged among satellite devices.

Figure 2:
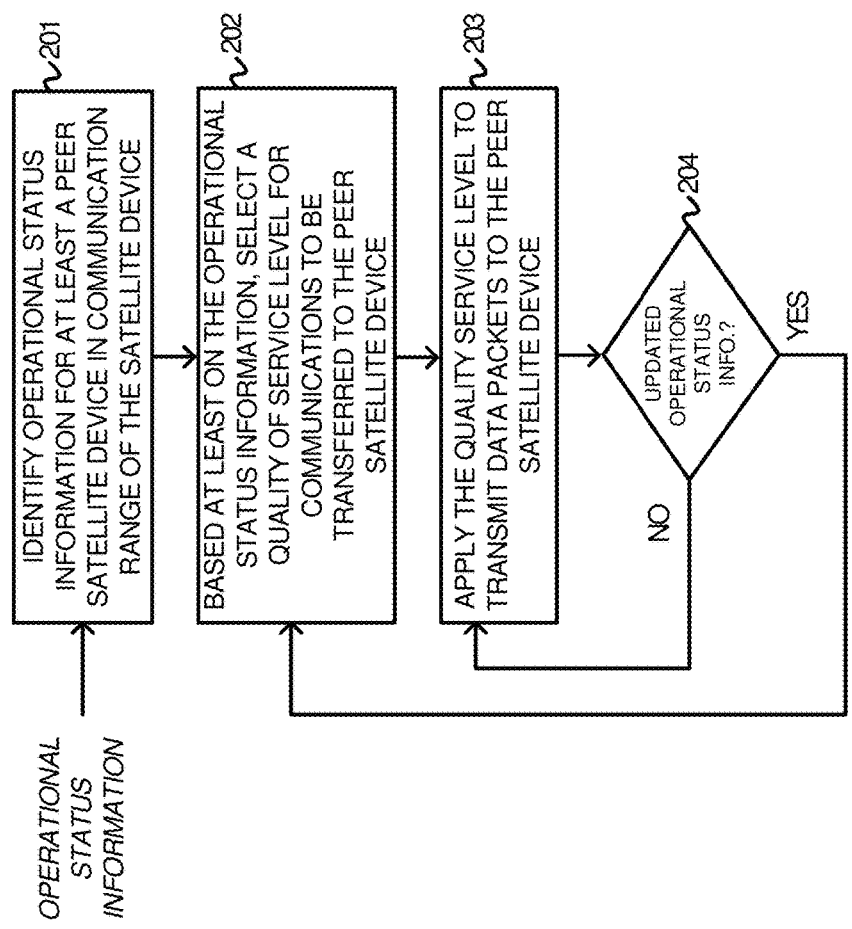
FIG. 2 illustrates operations of a satellite environment according to an implementation.

FIG. 2 is now provided to illustrate operation of the satellite systems and devices with regard to altering quality of service (QoS) levels applied to various communications. In FIG. 2, operational status information is provided to a particular satellite device. For example, satellite device 112 might monitor operational status 160 for satellite device 112, and provide this operational status via operational updates 150 to satellite device 111 and via operational updates 151 to satellite device 113. Satellite device 112 might provide this operational status to other satellite devices, not shown in FIG. 1 for clarity, such as satellite devices in other layers or constellations. Operational updates 150-151 are shared between satellite devices on a regular basis, such as periodically according to a predetermined time cycle, or updated responsive to changes in the operational status. Operational updates can occur over one or more radio (RF) links, optical links, or other communication media. In FIG. 1, these links might comprise links 141-142. Once received into a particular satellite device, such as satellite device 111, the operational status can be stored for later use by satellite device 111 when communicating with satellite device 112. Satellite device 111 can also determine operational status for itself, which might be transferred to other satellite devices as with satellite device 112, or might be stored and employed in combination with the operational status received from satellite device 112.

When communications are to be transferred from a source satellite device to a peer satellite device, then the source satellite device can identify (201) operational status information for at least the peer satellite device in communication range of the source satellite device. For example, communications to be transferred from satellite device 111 to satellite device 112 can have a service level adjustment or quality of service level applied thereto. The QoS level selected and applied is based on operational status information (202) of the peer satellite device as well as the source satellite device. As mentioned above, the operational status information can include information received by satellite device 111 in operational updates 150 from satellite device 112, as well as on other factors, such as operational status information of satellite device 111.

The operational status information can relate to a present provisioning of hardware or software of the peer satellite device, present data storage availability on the peer satellite device, present processor loading of the peer satellite device, present relative positioning of the peer satellite device, and present communication interface availability of the peer satellite device, among other operational status. The operational status information might comprise a present computing capability of the peer satellite device, or might be used to determine a present computing capability of the peer satellite device. The present computing capability can include a present processor (CPU/GPU) workload, a present free data storage capacity, and a present available communication bandwidth to receive the communications from the satellite device, among other computing metrics and considerations of the peer satellite device.

Various QoS levels can be selected among to apply to communications and communications handling operations in satellite devices. A predetermined categorization can be established for communications based on communication type, communication content, or communication bandwidth requirements, among other factors. Various graduated levels can be established for communications so that various levels of present capability of the peer satellite device indicated in the operational status updates can be translated into QoS levels that are applied to communications during transfer to the peer satellite device.

As an example, each time that a satellite device wants to send data to a peer satellite device, based on what type of data is to be sent, various operational factors are evaluated to assign a QoS. The data types can include those discussed herein, as well as application images, application data to be processed by the peer satellite device, or data that is merely to be routed by or passed through the peer satellite device. For example, the destination peer satellite device might have sufficient data storage capacity to accept a new application image, an associated CPU/GPU is not running above a certain utilization percentage, and the peer satellite device has sufficient available communication bandwidth, then the originating satellite device can send the application update with a high priority QoS. If the inverse is true, then the application update may be sent with a low priority QoS or may not be sent to the peer satellite device at this point in time at all if conditions are below a predetermined threshold. Example cases where only one of the factors may be evaluated (i.e. if 'x' true), cases where many independent factors may be evaluated (i.e. if 'x' or 'y' true), and cases where there is a conditional evaluation that would take place (i.e. if 'x' and 'y' and 'z' true) to make the QoS level decision. As discussed herein, a number of criteria can influence a QoS level selection decision for the communication of information between two satellite devices.

As a further example, based at least on a present operational capability for satellite device 112 determined to be above a threshold operational capability, satellite device 111 can assign a first quality of service level to communications for transfer to satellite device 112. Based at least on the present operational capability for satellite device 112 determined to be below the threshold operational capability, then satellite device 111 can assign a second quality of service level lower than the first quality of service level to the communications for transfer to satellite device 112. At times, the communications comprise software components for delivery to satellite device 112. The software components can comprise software applications, software application updates, and virtual node configurations that directing execution of one or more software applications. Based at least on the present operational capability of satellite device 112 supporting execution of at least a software component on satellite device 112, then satellite device 111 can transfer the software component to satellite device 112 at a first quality of service level. Based at least on the present operational capability of satellite device 112 not supporting execution of at least the software component on satellite device 112, then satellite device 111 can transfer the software component to satellite device 112 at a second quality of service level lower than the first quality of service level.

Once an appropriate QoS level is determined based in part on the operational status information, then the source satellite device can apply (203) the QoS levels to transmit the communications comprising one or more data packets sent to the peer satellite device. In FIG. 1, these communications can be transferred over link 141 from satellite device 111 to satellite device 112. During transfer of the communications, or subsequently, various updated operational status information can be received or determined (204) for the peer satellite device or the source satellite device. Adjustments can be made to the QoS levels selected for communications that are in process of being transferred, or for further communications transferred after a current transfer process.

Returning to a discussion of the elements of FIG. 1, satellite devices 111-118 can comprise various hardware and software elements included in an orbital package. In some examples, the satellite devices comprise CubeSat form-factor devices, although variations are possible. Satellite devices can include one or more sensors, communication circuitry, processing circuitry, and control/logistical management elements. Figure discussions of satellite devices are included in FIG. 3 and FIG. 6 below.

Satellite devices 111-118 each include a hardware and software configuration that permits applications to execute as virtual nodes on the satellites. In some implementations, satellite devices 111-118 may be launched using a launch system without applications, and instead may be provided with a base operating system, virtual machine images, or hypervisor that can be used to load and execute applications as provided in an uplink from ground control system 170. In other implementations, satellite devices 111-118 may be configured with a first set of applications capable of being executed via an operating system or hypervisor on the satellites. Once into orbit, the applications may initiate execution to provide the operations of the applications. These applications may further be added to, removed, and modified based on information provided in the uplink from ground control system 170.

Ground control system 170 comprises one or more control systems, servers, distributed computing and storage systems, among other elements. Typically, ground control system 170 includes one or more communication systems for receiving communications from satellite devices and for transferring communications to satellite devices. Ground control system 170 can include further network links to other networks, such as packet networks, the Internet, and other entities. In some examples, software payloads are staged in ground control system 170 and deployed to one or more satellite devices over ground-to-satellite link 145. Once received by at least a first satellite device, these software payloads can be distributed over peer-to-peer communication links among proximate satellite devices. Ground control system 170 can receive network traffic from satellite devices and route the network traffic to other network systems using include routes, bridges, switches, and other network handling equipment. Ground control system 170 also can receive network traffic for delivery to the satellite devices and transfer this network traffic for delivery to the satellite devices for distribution of the network traffic over the various orbital layers, pathways, and peers of the satellite cluster.

Links 141-143 and link 145 each comprise one or more communication pathways for exchanging network communications. Links 141-143 and link 145 can each comprise various logical, physical, or application programming interfaces. Example links can use optical, air, space, or some other element as the transport media. Links 141-143 and link 145 can each use various protocols and formats, such as Internet Protocol (IP), Ethernet, transmission control protocol (TCP), WiFi, Bluetooth, other wireless data interfaces, or some other communication format, including combinations, improvements, or variations thereof. Links 141-143 and link 145 can each include direct links or may include intermediate networks, systems, or devices, and can include a logical network link transported over multiple physical links. Links 141-143 and link 145 can each include routers, switches, bridges, traffic handling nodes, and the like for transporting traffic among endpoints.

Figure 3:
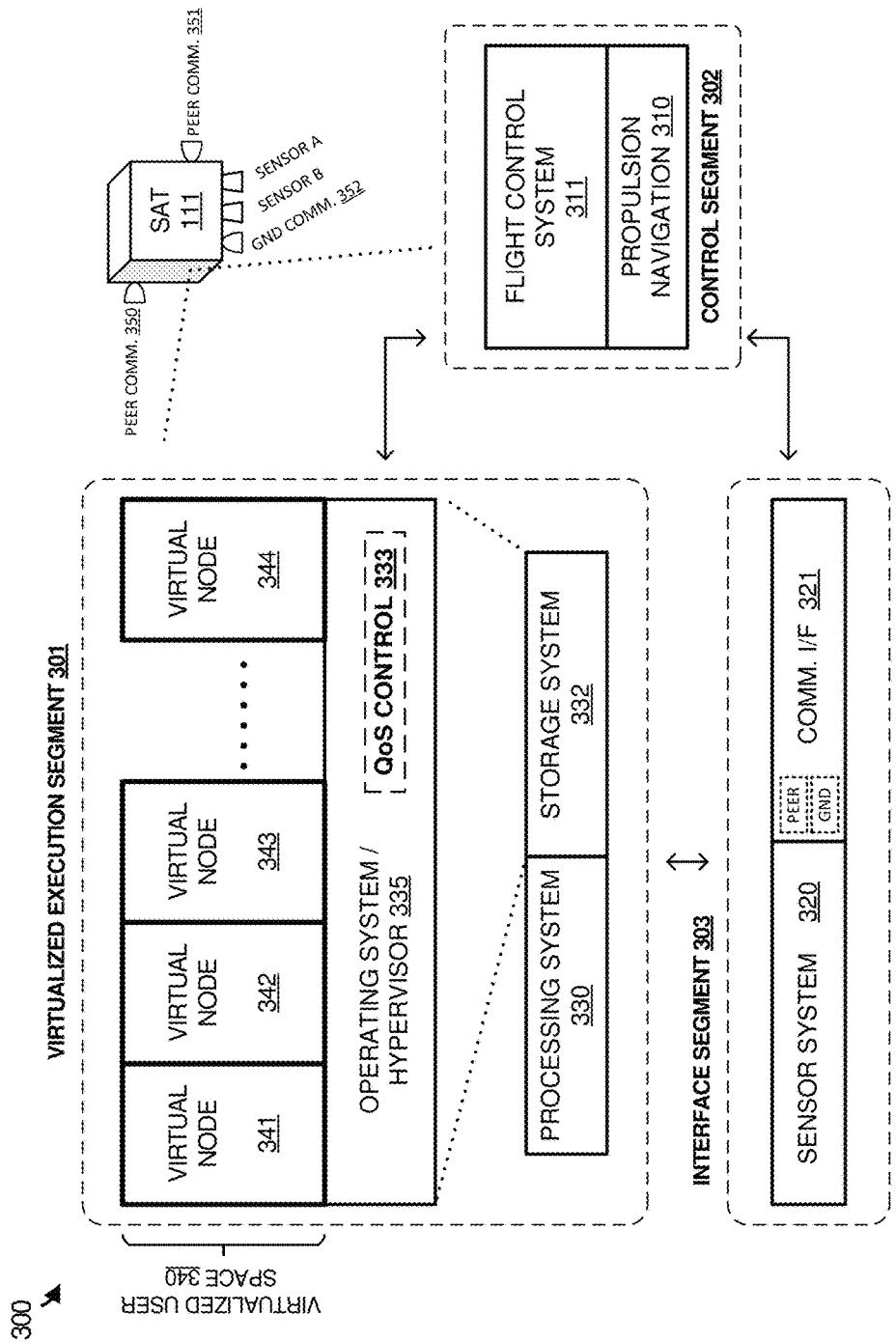
FIG. 3 illustrates an expanded view of a satellite capable of providing a platform for virtual nodes according to an implementation.

FIG. 3 illustrates an expanded view 300 of an exemplary satellite device 111 from FIG. 1, which is capable of providing a platform for virtual nodes according to an implementation. View 300 provides an example implementation of satellite device 111 that can provide communication services as described herein. Any of satellite devices 111-118 of FIG. 1 can include similar features, and satellite device 111 is included as representative of any satellite device.

Specifically, one or more virtual nodes 341-344 are provided in satellite 111, which can have associated communications handled according to various quality of service level adjustments. Satellite device 111 includes virtualized execution segment 301, control segment 302, and interface segment 303, which may be coupled using various communication links. Virtualized execution segment 301 is representative of a virtualized execution system, which includes a virtualized user space 340 for virtual nodes 341-344, an operating system or hypervisor 335, a storage system 332 to store the operating system and virtual user space, and a processing system 330. Control segment 302 further includes flight control system 311 and propulsion navigation 310. Interface segment 303 further includes user sensor system 320 and communication interface 321.

Communication interface 321 may be used for ground (gnd) communication and inter-satellite (peer) communication. The peer communications may be provided by a transceiver and/or antenna system, indicated by elements 350-351 in FIG. 3. The ground communications may be provided by a transceiver and/or antenna system, indicated by element 352 in FIG. 3. Elements 350-352 can each comprise separate transceivers/antenna systems, although in some examples portions thereof may be shared. In some examples, a common communication interface can be shared by both virtualized execution system 301 and control segment 302. However, in further examples, control segment 302 might have a dedicated pathway and transceiver/antenna system for separate communication with a ground system. Moreover, in further examples, virtualized execution system 301 can have a dedicated pathway for separate communication with peer satellite devices.

Satellite device 111 can include one or more sensor devices provided by sensor system 320. Sensor system 320 can comprise imaging sensors, temperature sensors, light sensors, signal quality sensors, or some other similar sensor capable of interaction with virtual nodes 341-344. In FIG. 3, sensors 'A' and 'B' are shown as illustrative of downwardfacing sensors. It should be understood that other sensors can be included, such as star sensors, position sensors, space imaging sensors, radiation detectors, or other sensors.

As described herein, organizations may generate applications that are capable of being deployed as virtual nodes on one or more satellites of a satellite platform. These applications may be provided from a ground control system, or may be provided from another satellite via communication interface 321 on satellite device 111. Once the applications are provided, operating system/hypervisor 335, which is stored on storage system 332 and executed by processing system 330 may provide a platform for the execution of the applications. Here, each application provided to satellite device 111 is executed as a separate virtual node in virtual nodes 341-344, wherein the virtual nodes may comprise full operating system virtual machines or containers capable of sharing resources from the underlying operating system in storage system 332.

To manage the execution of the virtual nodes, operating system/hypervisor 335 may comprise a control system to manage a schedule that is used to allocate processing resources of processing system 330 to each of the nodes, user sensors 320 to each of the nodes, and other similar resources on satellite device 111. In particular, the schedule may be used to ensure that each application is scheduled to receive processing resources from processing system 330 during defined time periods, and receive access to user sensors 320 during defined time periods. In some implementations, one or more of the applications may execute during the same time period on satellite device 111. These applications may use different sensors in user sensors 320, may time share the use of sensors in user sensors 320, or may use the same data from user sensors 320 in their operation. To allocate the sensors operating system 335 may be responsible for providing each operating virtual node with a communication link to the required user sensor, and deallocating or removing the communication link to the required sensor based on the scheduling. For example, an imaging device may be accessed by virtual node 341 during a first time period, wherein virtual node 341 may access the sensor based on addressing information provided by operating system 335. Once the time period expires, operating system 335 may prevent virtual node 341 from accessing the sensor, in some examples, by removing the addressing access of the virtual node, and allocating access of the sensor to a second virtual node.

To further manage the execution of the virtual nodes, operating system/hypervisor 335 may comprise quality of service (QoS) control module 333. QoS control module 333 can be included in operating system/hypervisor 335 as pictured in FIG. 3, but one or more portions of QoS control module 333 can be included in other elements of satellite device 111, such as communication interface 321, control segment 302, or individual ones of virtual nodes 341-344. Virtual nodes 341-344 may generate, route, or handle communication traffic for delivery to other virtual nodes of other satellite devices in a satellite cluster.

In a first QoS control example, these communications can be prioritized according to QoS levels to share a bandwidth of a communication link provided by communication interface 321. The communication resources of at least communication interface 321 can be allocated among virtual nodes 341-344 according to presently available bandwidth or present relative distances among satellite devices when peer communications are employed. When ones of the virtual nodes are executed in parallel or concurrently, then operating system/hypervisor 335 or other control systems can direct at least communication bandwidth allocations of inter-satellite communications among various communication types of the virtual nodes based at least in part on available bandwidth. As bandwidths change, then the bandwidth allocations can also change to prioritize certain traffic types over other traffic. In a second QoS control example, as many of the examples herein illustrate, QoS levels themselves for communications can be selected among based in part on various static and dynamic factors of the originating satellite device and the destination satellite device. QoS control module 333 can enforce these QoS levels upon virtual nodes 341-344 for communications that might occur over communication interface 321 for both peer communications and ground communications.

In addition to the virtual node operations provided in virtualized execution segment 301, satellite device 111 further includes control segment 302. Control segment 302, which may be communicatively linked to virtualized execution segment 301 and interface segment 303, is responsible for logistical control elements of the satellite device 111. These operations may include managing the deployment of solar panels on the satellite, managing the positioning of the satellite device with regards to neighboring satellite devices of a satellite cluster, managing the positioning of the satellite device with regards to the Earth or the sun, performing orbital adjustments, or any other similar operation. In at least one example, flight control system 311 may monitor for requests from operating system 335, and determine whether the satellite is capable of accommodating the request from operating system 335. For example, virtual node 341 may generate a request to move a user sensor, which also requires movement using propulsion and navigation 310. In response to the request, flight control system 311 may determine that the movement cannot be made, and may prevent the movement of the satellite using propulsion and navigation 310. Further, in some implementations, flight control system 311, may provide a notification to operating system 335 and virtual node 341 indicating that the movement is not permitted.

In further examples, flight control system 311 can comprise a logistical control system for virtualized execution segment 301 or interface segment 303, and may monitor for requests to adjust relative positioning with respect to at least one neighboring satellite device. These requests can be issued to move satellite devices closer in relative distance to accommodate bursts of communication traffic generated by one or more virtual nodes, where the bursts of traffic desire to have a higher bandwidth communication link than presently established with another satellite device. Likewise, flight control system 311 may monitor for requests from operating system 335 to adjust relative positioning farther from a particular satellite device to either approach another satellite device in relative distance or to resume a nominal position that balances distances between two or more satellite devices. These requests might include cyclic or repeated periodic adjustments that allow for predictable changes in relative distance over the course of time. Various traffic differentiations, traffic prioritizations, quality of service adjustments, or virtual node execution prioritizations can be adjusted concurrent with the relative distance adjustments.

Propulsion and navigation elements 310 can comprise various equipment to move an associated satellite device with respect to neighboring satellite devices, move into different orbital configurations, adjust relative distances among satellite devices, or perform orientation/attitude adjustments. Propulsion and navigation elements 310 might comprise various engines, thrusters, inertial control and manipulation elements, or other elements capable of making adjustments to position, orientation, orbit, speed, or other movement parameters. Propulsion and navigation elements 310 can also comprise distance sensing equipment or navigation equipment to determine relative distances from Earth 190 or from other satellite devices. This distance sensing equipment or navigation equipment can comprise laser ranging equipment, radar equipment, or signal strength sensing equipment. Further examples can employ systems to determine geographic coordinates using one or more global positioning systems (GPS, GLONASS, Galileo), star-tracking systems, visual tracking systems, accelerometer-based tracking systems, or dead-reckoning systems, among others.

Although illustrated as a separate system in the example of FIG. 3, it should be understood that in some examples, flight control system may be implemented and stored on processing system 330 and storage system 332. However, it should also be understood that flight control system may be stored on a separate storage system and use a different processing system than operating system 335 and its corresponding virtual nodes.

Figure 4:
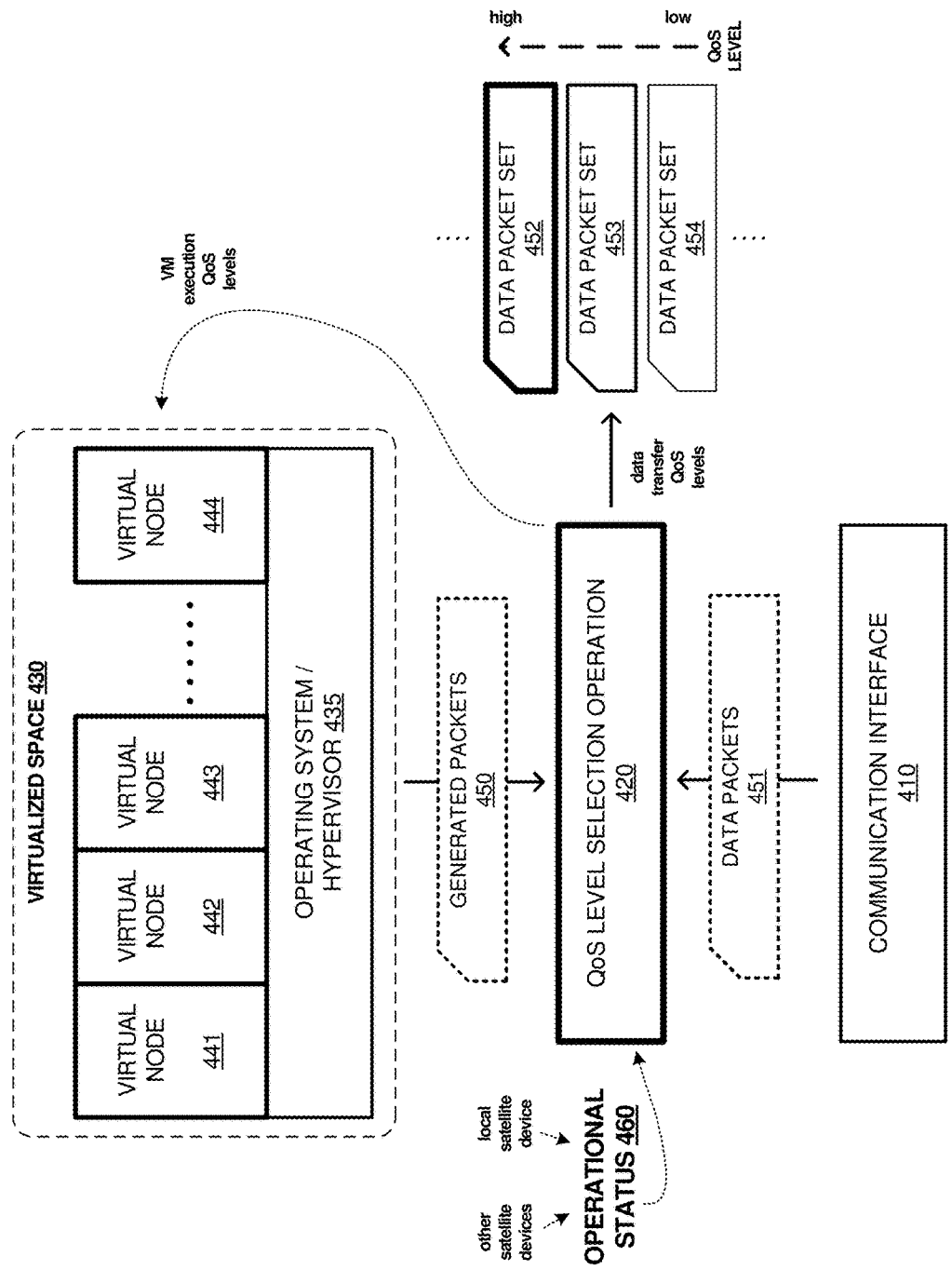
FIG. 4 illustrates a satellite traffic prioritization environment according to an implementation.

FIG. 4 illustrates an overview of managing the prioritization of data packets according to an implementation. The processes and operations of FIG. 4 can illustrate similar elements of FIG. 3. FIG. 4 includes virtualized space 430, QoS level selection operation 420, communication interface 410 and data packets 450-454. In some examples, QoS level selection operation 420 can be provided by QoS control operation 333 of FIG. 3, although variations are possible.

In operation, virtualized space 430 provides a platform for virtual nodes 441-444, and virtual nodes 441-444 comprise virtual machines and/or containers that execute via operating system/hypervisor 435. During execution of the virtual nodes, which represent applications of various organizations deployed in the satellite, the virtual nodes may require communications with other satellite devices and/or a ground control system. In providing these communications, the packets are provided from virtualized space 430 to QoS level selection operation 420. In addition to the packets from the virtualized space, QoS level selection operation 420 further receives data packets 451 from communication interface 410. These data packets may comprise packets from other satellites, as well as packets from a ground control system for the satellite platform. The data packets may include configuration information to be forwarded to other satellite devices, application data (processed or unprocessed) obtained at one or more other satellite devices, health check information, or any other similar information.

When communications in the form of data packets or other traffic are to be transferred from a source satellite device comprising virtualized space 430 to a peer satellite device, then the source satellite device can first identify operational status 460 for at least the peer satellite device. Operational status 460 can include information received from other satellite devices that updates the source satellite device as to status information of the other satellite devices. This status information can be used to select QoS levels for data packets 450 before transfer from virtual nodes 441-444 to other satellite devices. Various QoS levels can be selected among to apply to communications and communications handling operations in satellite devices. A predetermined categorization can be established for communications based on communication type, communication content, or communication bandwidth requirements, among other factors. Various graduated levels can be established for communications so that various levels of present capability of the other satellite devices indicated in operational status 460 can be translated into QoS levels that are applied to communications during transfer to the other satellite devices.

Operational status 460 can relate to a present provisioning of hardware or software of other satellite devices, present data storage availability on the other satellite devices, present processor loading of the other satellite devices, present relative positioning of the other satellite devices, and present communication interface availability of the other satellite devices, among other operational status. The operational status information might comprise a present computing capability of the other satellite devices, or might be used to determine a present computing capability of the other satellite devices. The present computing capability can include a present processor (CPU/GPU) workload, a present free data storage capacity, and a present available communication bandwidth to receive the communications from the source satellite device, among other computing and communication metrics of the other satellite devices. Other operational status and associated factors are discussed herein, and not limited to those discussed.

QoS level selection operation 420 may assign QoS levels to form various sets of data packets associated with virtual nodes 441-444 to form data packet sets 452-454 for transmission to at least one other satellite device or a ground control system. These sets can be associated with individual QoS levels, which might include three sets/levels as seen in FIG. 4, or might include further levels, such as ten seen in FIG. 5. Regardless of the quantity of levels of QoS, various data packets can be assigned among the various QoS levels based on the factors discussed herein. QoS level selection operation 420 can first determine a categorization among data packets, and use this categorization to apply different QoS levels based on the various factors discussed herein. In a first categorization example, an identity or property of each of virtual nodes 441-444 can be used to differentiate among QoS levels. In a second categorization example, a data type of the data packets, which may or may not relate to a virtual node identity, can be used to differentiate among QoS levels. For example, a header of each of the data packets may include a tag or flag that indicates the type or contents of the data packet, and categorization into a QoS level can be determined from the header. Packet addressing might also be employed in differentiation. The header can indicate various predetermined packet types/content, among configuration packets, ground control system packets, state packets for an application operating in the satellite platform among the virtual nodes, application identities, software payload contents, cryptocurrency indicators, health check packets, or some other packet type/content. Based on the various factors indicated by operational status 460, each of the data types can be assigned QoS levels for transfer via a corresponding satellite communication system.

FIG. 4 shows a plurality of sets or categorization among data packets, namely sets 452-454. Each of these sets can correspond to individual queues, buffers, or other data structures that can be formed using the data packets and organized according to QoS levels. These data structures can then be serviced by a communication or network module according to the QoS levels. Although only three sets/categorizations are employed in FIG. 4, ranging from a 'low' to a 'high' relative QoS level, more discrete and specific levels are discussed in FIG. 5 below.

In addition to categorizing data packets issued by virtual nodes 441-444, further QoS differentiation among virtual nodes can be achieved using the techniques herein. Specifically, resources of the satellite device that hosts virtualized space 430 might differentiate execution priority among ones of virtual nodes 441-444. This execution priority can be determined using QoS level selection operation 420. QoS level selection operation 420 can determine identities among the virtual nodes and indicate an execution priority or QoS level to assign to the virtual nodes to hypervisor 435 which then provides computing or execution resources according to the QoS level. Moreover, QoS level selection operation 420 can monitor data packets issued for transfer by the virtual nodes and determine QoS levels for the data packets, as discussed about for sets 452-454. The resulting sets can be fed back to hypervisor 435 to control execution priority among the virtual nodes according to the QoS levels determined by QoS level selection operation 420 from the data packets. This execution prioritization might be one example technique to indirectly achieve data packet prioritization among virtual nodes instead of directly categorizing data packets into sets 452-454.

FIG. 5 is presented to indicate various categorization of data packets into QoS levels based on the static and dynamic factors discussed herein. FIG. 5 illustrates example QoS level selections among various communication traffic types associated with on-satellite elements and processes. FIG. 5 includes table 500 which indicates example QoS level selection based on dynamic factors, and table 501 which indicates example QoS level selections based on static factors. These factors can be combined and considered in conjunction with one another when more than one factor applies. A predetermined QoS level selection can be made when more than one categorization applies, such as the lowest among the QoS levels, highest among the QoS levels, or a weighted average among the QoS levels, among others.

In tables 500-501, a first column indicates particular communication traffic types which can be assigned QoS levels, a second column indicates a particular factor (dynamic or static) to be considered, a third column indicates a metric value for each factor, and a fourth column indicates QoS level that is to be provided to the particular communication traffic types based on the first three columns. QoS levels range from level 0 (suspend communications), level 1 (best effort, lowest functional QoS level), to level 10 (high priority QoS level). Communication traffic types with higher relative QoS levels operate at a higher prioritization than communication traffic types with lower relative QoS levels. Although the examples in FIG. 5 are generally related to communication link bandwidth allocation among communication traffic types, other prioritizations can be achieved in a similar fashion, such as virtual node execution priority indicated in FIG. 4.

Turning now to a discussion of the various communication traffic types in the first column of tables 500-501, each communication traffic type indicates a particular data transfer task which relates to communications issued by virtual nodes of an originating satellite device. The traffic is typically directed to one or more peer satellite devices which may be a final destination of the traffic or a 'hop' to route the traffic to another system (such as a ground communication system). The factors can relate to operational status indicated for another "peer" satellite device, or might relate to operational status of the originating satellite device. For examples, virtual machines (virtual nodes) and user applications (software payloads) might generate traffic types indicated in tables 500-501.

Example traffic types include application image transfers, ground communications, blockchain synchronization processes, and user payload transfers. Application image transfers comprise payloads which can be transferred to another satellite for execution by that satellite. Application image transfers can include application-level containers, virtual machine containers, virtual machine images, virtual node images, installable application data, executable application data, binary files, configuration information for applications, among other data. System updates, such as operating system updates, hypervisor updates, flight control software updates, and other such data might also comprise application image transfers or might be considered as separate tasks in other examples. Ground communications comprise traffic for transfer to a ground communication system, such as ground control system 170 in FIG. 1. A peer satellite device might be positioned to communicate with a ground communication system and thus the source satellite device might have traffic for routing by the peer satellite device to the ground communication system and further systems, such as other terrestrial/satellite networks or the Internet at large.

User software payloads can include applications provided by users for execution on satellite devices, which may include individual application binaries or installation files for use within generalized virtual nodes. User software payloads can comprise state information related to configurations, execution status, processed data results, or virtual machine/node state. Virtual machine file level state transfers might include state synchronization among virtual machines for backing up operational state of virtual nodes using file-level or block-level representations of state. File-level representations might need less bandwidth/throughput than block-level state transfers, and thus are more suitable to lower bandwidths or lower QoS levels. Moreover, specific application payloads, such as cryptocurrency handling applications and cryptocurrency virtual nodes, can each be assigned various QoS levels for associated traffic as indicated in table 500. Cryptocurrency or other blockchain synchronization processes can be differentiated among when different blockchain algorithms are employed by various blockchain application payloads, or might be differentiated among based on customers paying for different levels of service.

The factors indicated in the second column of tables 500-501 can include any of the static, dynamic, or quasi-static factors discussed herein. The factors comprise peer satellite device factors for which traffic is destined in most examples. Status updates in the form of operational status are regularly received from peer satellite devices in communication range of the source satellite device. These status updates can be used as the metrics in tables 500-501 to alter QoS level selections in real-time or responsive to receipt of the status updates. The factors can include present computing capabilities of a peer satellite device, present provisioning of hardware or software of the peer satellite device, present data storage availability on the peer satellite device, present processor loading of the peer satellite device, present relative positioning of the peer satellite device, and present communication interface availability of the peer satellite device, among others. In further examples, operational status of the source satellite device might be considered in conjunction with operational status of a peer satellite device, or a relative difference between source satellite device operational status and peer/destination satellite device operational status.

Specific non-limiting examples of dynamic and static factors are listed in FIG. 5. These examples include central processing unit utilization levels (CPU UTIL.), available data storage capacity (STORAGE), satellite-to-ground communication link availability (GND LINK), underlying geographic region on the surface of the Earth (GEO REGION), orbital satellite layer in which the satellite resides or orbital distance of the satellite (SAT. LAYER), graphics processing unit availability (GPU AVAIL.), and a type or payload complement of the satellite (SAT. TYPE).

Turning first to table 500, a first row and a second row indicate a QoS level of 2 is provided to application image transfer traffic when the CPU utilization level of the peer satellite device is greater than 80% utilization, and a QoS level of 7 is provided to application image transfer traffic when the CPU utilization level of the peer satellite device is less than 20% utilization. In third and fourth rows, a QoS level of 7 is provided to application image transfer traffic when the available data storage capacity of the peer satellite device is greater than 100 megabytes (MB), and a QoS level of 2 is provided to application image transfer traffic when the available data storage capacity of the peer satellite device is less than 100 MB. In fifth and sixth rows, a QoS level of 5 is provided to ground communications traffic when the satellite-to-ground communication link availability of the peer satellite device is available, and a QoS level of 0 is provided to ground communications traffic when the satellite-to-ground communication link availability of the peer satellite device is unavailable. In seventh and eight rows, a QoS level of 10 is provided to user software payload traffic when a position of the peer satellite device over a predetermined underlying region/zone on Earth, and a QoS level of 1 is provided to user software payload traffic when the position of the peer satellite device is not over a predetermined underlying region/zone on Earth. In ninth and tenth rows, a QoS level of 8 is provided to blockchain synchronization traffic when the CPU utilization level of the peer satellite device is less than 50% utilization, and a QoS level of 1 is provided to blockchain synchronization traffic when the CPU utilization level of the peer satellite device is greater than 50% utilization.

Turning first to table 501, in a first and a second row, a QoS level of 6 is provided to user software payload traffic when a present satellite layer in which the peer satellite device is positioned corresponds to an upper satellite layer, and a QoS level of 3 is provided to the user software payload traffic when the present satellite layer in which the peer satellite device is positioned corresponds to a lower satellite layer. The upper and lower satellite layers can correspond to a cluster or set of satellite devices orbiting together in a predetermined orbital path that has an orbital distance from the surface of the Earth. A lower layer can correspond to a first orbital distance, while the upper layer can correspond to a second orbital distance greater than the first orbital distance. The various orbital layers can have different inclinations or orbital parameters, and need not be concentric or overlapping. In third and fourth rows, a QoS level of 1 is provided to user software payload traffic when GPU circuitry is not present or available on the peer satellite device, and a QoS level of 9 is provided to user software payload traffic when GPU circuitry is present or available on the peer satellite device. This can be employed when particular graphics processing, image processing, or blockchain processing is to be given favored traffic handling to peer satellite devices with GPU hardware features. In fifth and sixth rows, a QoS level of 8 is provided to application image transfer traffic when a satellite type or hardware complement includes communication relay, communication routing, or communication relay features, and a QoS level of 4 is provided to application image transfer traffic when a satellite type or hardware complement includes sensor features or specific sensor features. This can be employed to provide favored traffic handling to satellite devices that have a particular suite of on-board hardware features or functions.

Figure 6:
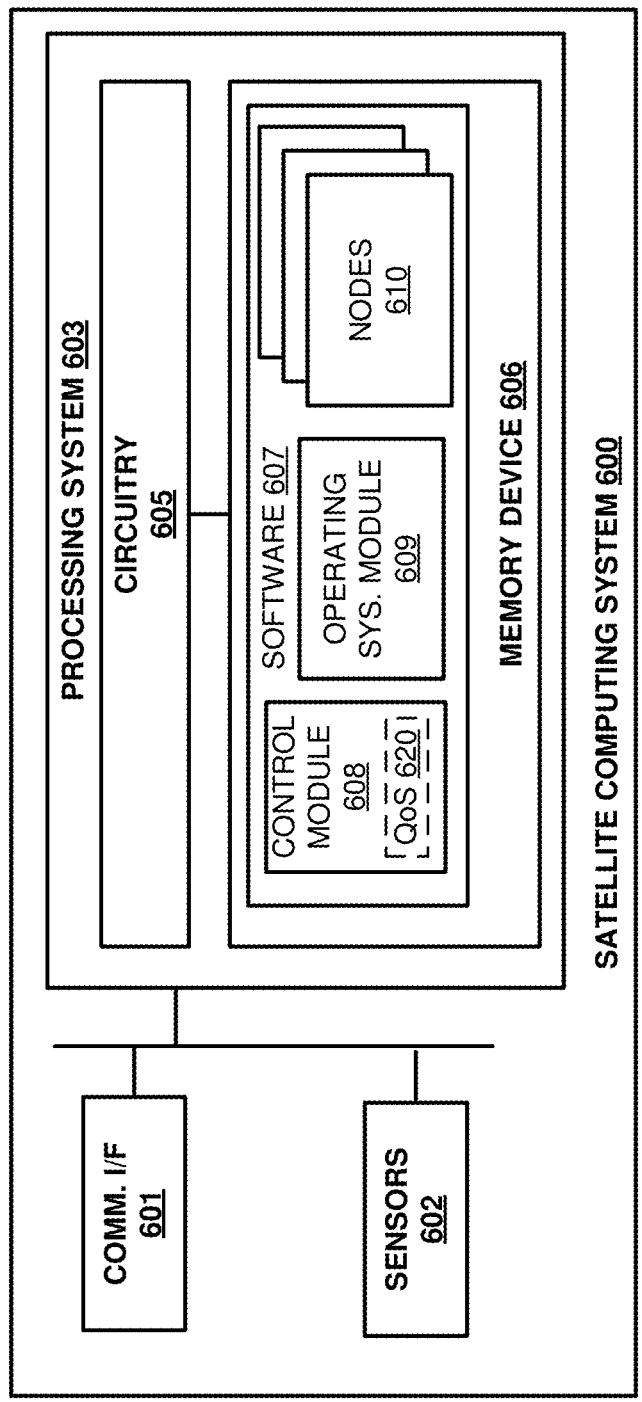
FIG. 6 illustrates a satellite computing system to provide a virtualized satellite application platform according to an implementation.

FIG. 6 illustrates a satellite computing system 600 to provide a virtualized satellite application platform according to an implementation. Computing system 600 is representative of any computing system or systems with which the various operational architectures, processes, scenarios, and sequences disclosed herein for a satellite device may be implemented. Computing system 600 can be an example of a satellite device from any of the preceding Figures, although other examples may exist. Computing system 600 comprises communication interface 601, sensors 602, and processing system 603. Processing system 603 is linked to communication interface 601 and sensors 602. Sensors 602 may comprise imaging sensors, heat sensors, light sensors, or some other similar type of sensor. Processing system 603 includes processing circuitry 605 and memory device 606 that stores operating software 607. Computing system 600 may include other well-known components such as a battery, solar panels, and enclosure that are not shown for clarity.

Communication interface 601 comprises components that communicate over communication links, such as network cards, ports, radio frequency (RF) circuitry, optical signaling circuitry, processing circuitry and software, or some other communication devices. Communication interface 601 may be configured to communicate over wireless links which use air or space as the communication medium. The wireless links can comprise any wireless electromagnetic communication, such as RF communications, VHF communications, UHF communications, microware communications, optical communications (e.g. visible, infrared, or ultraviolet), and combinations thereof. Communication interface 601 may be configured to use optical signaling, Internet Protocol (IP), IEEE 802.11 WiFi, among various wireless protocols, communication signaling, or some other communication format, including combinations thereof. In some implementations, communication interface 601 may communicate with one or more other satellites in a satellite platform and communicate with a ground control system.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device, but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media.

Processing circuitry 605 is typically mounted on a circuit board that may also hold memory device 606 and portions of communication interface 601 and sensors 602. Operating software 607 comprises computer programs, firmware, or some other form of machine-readable program instructions. Operating software 607 includes control module 608, operating system module 609, and nodes 610, although any number of software modules may provide the same operation. Operating software 607 may further include utilities, drivers, network interfaces, applications, or some other type of software. When executed by processing circuitry 605, operating software 607 directs processing system 603 to operate computing system 600 as described herein.

In at least one implementation, virtual nodes 610 may be deployed to satellite computing system 600 that represent full operating system virtual machines or containers, wherein each node is configured to provide a particular application. To run the nodes, operating system module 609, which may comprise an operating system and/or a hypervisor, may be executed by processing system 603, wherein operating system module 609 provides a platform for nodes 610. In some implementations, in providing the platform, operating system module 609 may be configured with a resource schedule having resource prioritization, which allocates processing resources, communication resources, and sensor resources to each node in nodes 610 according to various quality of service levels. Operating system module 609 can employ QoS module 620 to achieve the resource prioritization. This resource prioritization may comprise time division allocation of resources, such as providing a first application with first quality of service levels for access to communication links or execution resources and providing a second application with second quality of service levels for access to the same communication links or execution resources, and may further include physical sharing of resources, such as providing one or more cores to a first virtual node and providing one or more secondary cores to a second virtual node.

In addition to executing the applications for each of virtual nodes 610, operating system module 609 may further provide a platform for state determination and distribution. This state determination may permit processing system 603 to identify states for each of the applications and share the states with other satellites and the ground control system. The states may include the operational state of processes within each application node, and/or data states for each of the application nodes. The states may be used in recovery of the various applications executing on satellite computing system 600, and may further be used in providing enhanced data operations for the applications. For example, an application executing as a node on satellite computing system 600 may communicate data to a second satellite node. This satellite node may identify second data, using processing elements or sensors on the second satellite, and combine the data from the first satellite with the second data to provide a particular operation. This operation may include imaging analysis in some examples, where the application can determine whether an object is moving, the type of object, the rate of movement in the object, or some other similar determination based on the combined data. This operation may include cryptocurrency operations, such as blockchain processes or cryptocurrency mining operations.

As an illustrative example, satellite computing system 600 may use sensors 602 to establish state information related to data gathered by the sensors. Once identified, the state information may be communicated to a second satellite device, wherein the second satellite device may employ second sensors to modify the state information with at least data captured by the second sensors. As another illustrative example, satellite computing system 600 may use one or more processing resources of processing system 603 to establish blockchain states related to cryptocurrency operations or other operations. Once blockchain states are determined, such as by processing a ledger or mining operations, the blockchain state information may be communicated to a second satellite device, wherein the second satellite device may employ second processing resources to modify the blockchain state information.

In some examples, in addition to or in place of exchanging the state information, the state information may also be used to provide a backup of satellite computing system 600. In particular, the state information may be shared with a second satellite device permitting the second satellite device to implement one or more virtual nodes from satellite computing system 600 when a failure is detected. This implementation or establishment of the one or more virtual nodes may occur directly at the satellite receiving the state information from satellite computing system 600, or may occur on a third satellite configurable by the satellite receiving the state information from satellite computing system 600.

Although illustrated in the previous example as providing information to other satellites, it should be understood that satellite computing system 600 may also be configured to receive state information from other satellites and provide similar operations in accordance with the received state information. These operations may include modifying the state information based on sensors for satellite computing system 600, modifying the state information based on processing resources of satellite computing system 600, or providing backup peering operations based on the state information provided from the secondary satellites. The state information and traffic related to state information can be assigned various QoS levels as discussed herein.

In further examples, control module 608 can include QoS module 620 to control selection or allocation of QoS levels for various types of communication generated or otherwise issued by nodes 610 for transfer over communication interface 601. QoS module 620 can be used to implement various QoS control modules discussed herein, such as QoS control elements of satellites 111-118, QoS control module 333, or QoS level selection operation 420, among others. Bandwidth allocations and prioritizations among communication types, tasks, application payloads, virtual nodes, or other element can be achieved using a combination of elements of system 600, such as control module 608, QoS module 620, operating system module 609, and communication interface 601.

As also illustrated in FIG. 6, satellite computing system 600 further includes control module 608, which is used as a flight control system for the satellite. In particular, control module 608, which may operate using distinct processing circuitry on satellite computing system 600, may be responsible for power management, logistics, and flight control of the satellite. In some examples, control module 608 may receive requests from nodes 610 and operating system 608 to provide data to the applications on nodes 610. If a request can be accommodated, without comprising the flight of the satellite, control module 608 may provide the requested data to operating system module 609 or the corresponding node. In contrast, if it is determined that the information cannot be provided or a flight operation cannot be accommodated, then control module 608 may fail to provide the data or the flight operation. In further examples, control module 608 can also be employed to control distance changes relative to another satellite device using one or more propulsion devices coupled to system 600.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A method of operating a satellite device, the method comprising:
identifying operational status information for at least a peer satellite device in communication range of the satellite device;
based at least on the operational status information, adjusting relative quality of service levels among communications issued by a plurality of virtual nodes executed by the satellite device for transfer to the peer satellite device; and
applying the quality service levels within the satellite device to transmit data packets issued by the plurality of virtual nodes to the peer satellite device.

2. The method of claim 1, further comprising:
obtaining at least a portion of the operational status information from the peer satellite device, wherein the operational status information relates to one or more of a present provisioning of hardware or software of the peer satellite device, present data storage availability on the peer satellite device, present processor loading of the peer satellite device, present relative positioning of the peer satellite device, and present communication interface availability of the peer satellite device.

3. The method of claim 1, further comprising:
identifying a present computing capability of the peer satellite device among the operational status information; and
based on at least the present computing capability, adjusting the relative quality of service levels to provide to the communications during transfer to the peer satellite device.

4. The method of claim 3, further comprising:
based at least on the present computing capability determined to be above a threshold computing capability, assigning a first quality of service level to the communications of a corresponding virtual node for transfer to the peer satellite device; and
based at least on the present computing capability determined to be below the threshold computing capability, assigning a second quality of service level lower than the first quality of service level to the communications of the corresponding virtual node for transfer to the peer satellite device.

5. The method of claim 3, wherein the present computing capability comprises at least one of a present processor workload, a present free data storage capacity, and a present available communication bandwidth to receive the communications from the satellite device.

6. The method of claim 1, further comprising:
identifying a present computing capability of the peer satellite device among the operational status information;
based at least on the present computing capability supporting execution of at least a software component on the peer satellite device, transferring the software component to the peer satellite device at a first quality of service level; and
based at least on the present computing capability not supporting execution of at least the software component on the peer satellite device, transferring the software component to the peer satellite device at a second quality of service level lower than the first quality of service level.

7. The method of claim 6, wherein the software component comprises at least one of a software application, a software application update, and a virtual node configuration directing execution of one or more software applications.

8. The method of claim 1, wherein the operational status information comprises a relative distance among the satellite device and the peer satellite device; and further comprising:
identifying a data type in the communications to be transferred to the peer satellite device;
determining a target quality of service level needed to support transfer of the communications comprising the data type to the peer satellite device;
when the relative distance can support the target quality of service level, assigning the target quality of service level to the communications for transfer to the peer satellite device; and
when the relative distance cannot support the target quality of service level, assigning a fallback quality of service level lower than the target quality of service level to the communications for transfer to the peer satellite device.

9. The method of claim 8, further comprising:
responsive to the relative distance not being able to support the target quality of service level, instructing at least among the satellite device and the peer satellite device to adjust the relative distance to achieve the target quality of service level.

10. A satellite device comprising:
one or more non-transitory computer readable storage media;
a processing system operatively coupled to the one or more non-transitory computer readable storage media; and
program instructions stored on the one or more non-transitory computer readable storage media to manage data packets communicated by the satellite that, when read and executed by the processing system, direct the processing system to at least:
receive operational status information from at least a peer satellite device;
based at least on the operational status information, adjust relative quality of service levels for communications issued by a plurality of virtual nodes executed by the satellite device for transfer to the peer satellite device; and
apply the quality service levels within the satellite device to transmission of data packets issued by the plurality of virtual nodes to the peer satellite device.

11. The satellite device of claim 10, wherein the operational status information relates to one or more of a present provisioning of hardware or software of the peer satellite device, present data storage availability on the peer satellite device, present processor loading of the peer satellite device, present relative positioning of the peer satellite device, and present communication interface availability of the peer satellite device.

12. The satellite device of claim 10, comprising further program instructions, when executed by the processing system, direct the processing system to at least:
identify a present computing capability of the peer satellite device among the operational status information; and
based on at least the present computing capability, adjust the relative quality of service levels to provide to the communications during transfer to the peer satellite device.

13. The satellite device of claim 12, comprising further program instructions, when executed by the processing system, direct the processing system to at least:
- based at least on the present computing capability determined to be above a threshold computing capability, assign a first quality of service level to the communications of a corresponding virtual node for transfer to the peer satellite device; and
- based at least on the present computing capability determined to be below the threshold computing capability, assign a second quality of service level lower than the first quality of service level to the communications of the corresponding virtual node for transfer to the peer satellite device.

14. The satellite device of claim 12, wherein the present computing capability comprises at least one of a present processor workload, a present free data storage capacity, and a present available communication bandwidth to receive the communications from the satellite device.

15. The satellite device of claim 10, comprising further program instructions, when executed by the processing system, direct the processing system to at least:
- identify a present computing capability of the peer satellite device among the operational status information;
- based at least on the present computing capability supporting execution of at least a software component on the peer satellite device, transfer the software component to the peer satellite device at a first quality of service level; and
- based at least on the present computing capability not supporting execution of at least the software component on the peer satellite device, transfer the software component to the peer satellite device at a second quality of service level lower than the first quality of service level.

16. The satellite device of claim 15, wherein the software component comprises at least one of a software application, a software application update, and a virtual node configuration directing execution of one or more software applications.

17. The satellite device of claim 10, wherein the operational status information comprises a relative distance among the satellite device and the peer satellite device, and comprising further program instructions, when executed by the processing system, direct the processing system to at least:
- identify a data type in the communications to be transferred to the peer satellite device;
- determine a target quality of service level needed to support transfer of the communications comprising the data type to the peer satellite device;
- when a relative distance can support the target quality of service level, assign the target quality of service level to the communications for transfer to the peer satellite device; and
- when the relative distance cannot support the target quality of service level, assign a fallback quality of service level lower than the target quality of service level to the communications for transfer to the peer satellite device.

18. The satellite device of claim 17, comprising further program instructions, when executed by the processing system, direct the processing system to at least:
- responsive to the relative distance not being able to support the target quality of service level, instruct at least among the satellite device and the peer satellite device to adjust the relative distance to achieve the target quality of service level.

19. A satellite system, comprising:
- a plurality of satellite devices configured to periodically exchange operational status information related to at least present computing capabilities among the plurality of satellite devices;
- the plurality of satellite devices configured to exchange communications among the plurality of satellite devices related to execution of one or more software payloads provisioned on the plurality of satellite devices; and
- during exchange of the communications, the plurality of satellite devices configured to adjust quality of service levels among the communications issued by the one or more software payloads for handling local portions of the communications based at least on the operational status information for proximate ones of the satellite devices, and apply the quality service levels to transmit data packets comprising the communications issued by the one or more software payloads.

20. The satellite system of claim 19, comprising:
- based at least on the operational status information indicating a present computing capability can support at least a software component on a target satellite device, a source satellite device proximate to the target satellite device configured to transfer the software component to the target satellite device at a first quality of service level; and
- based at least on the present computing capability not supporting the software component on the target satellite device, the source satellite device configured to transfer the software component to the target satellite device at a second quality of service level lower than the first quality of service level.

* * * * *